June 18, 1940.  J. U. McDONALD  2,204,902
PROCESS FOR PRODUCING GAS
Filed July 9, 1937
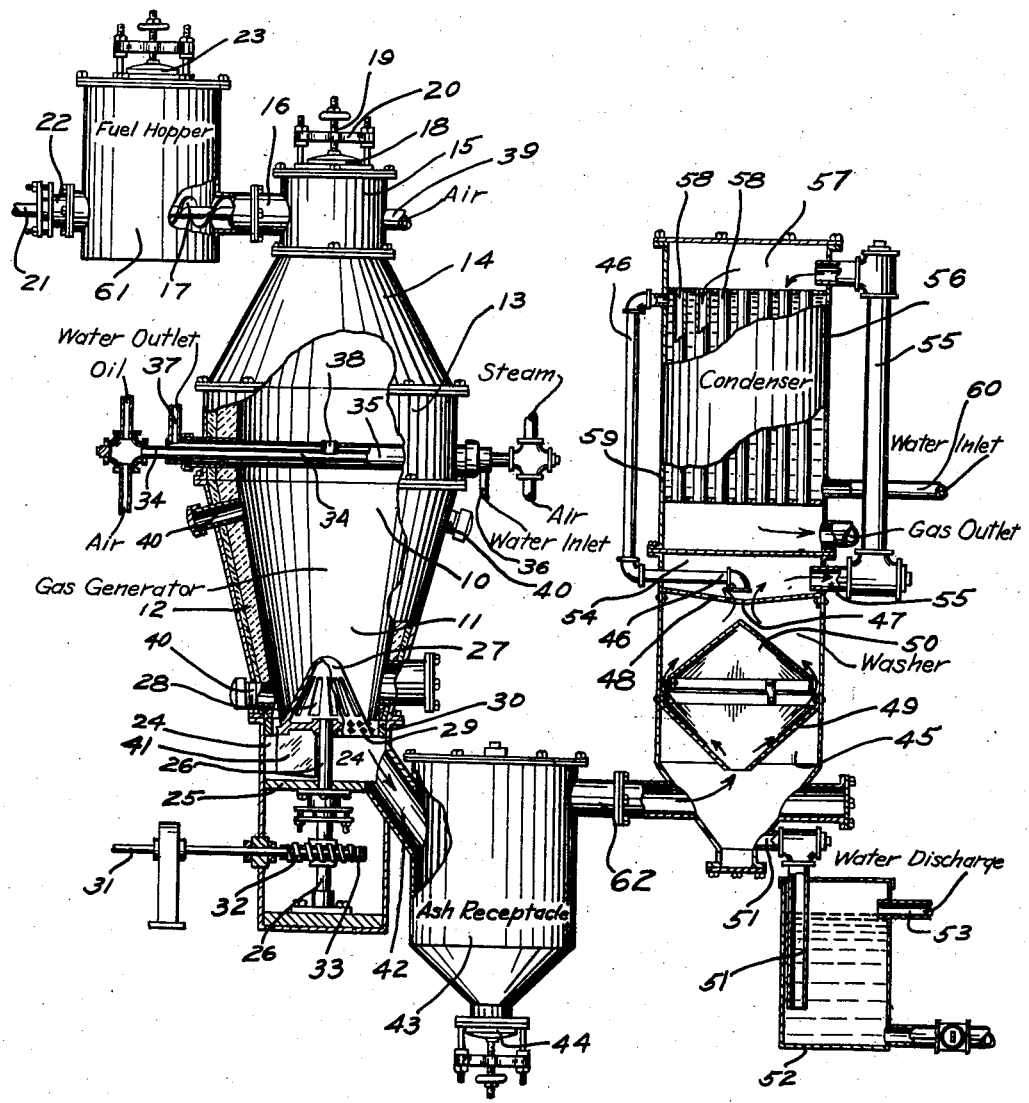
Inventor
John U. McDonald
BY Minturn & Minturn
Attorneys Patented June 18, 1940

2,204,902

UNITED STATES PATENT OFFICE 2,204,902

PROCESS FOR PRODUCING GAS

John U. McDonald, Clinton, Mo.

Application July 9, 1937, Serial No. 152,725

2 Claims. (Cl. 48—203)

This invention relates to a process for the manufacturing of gas for heating, illuminating and power purposes by the direct distillation of carbonaceous matter, especially coal, peat, saw-mill refuse, wood, garbage, oil and other like organic material, by apparatus, such for example as is illustrated in my application Serial No. 152,726, filed July 9, 1937, which has now matured into Patent No. 2,168,652, August 8, 1939. It is the primary object of the invention to produce a clean, fixed and permanent gas with high calorific value in a steady, rapid and continuous operation with complete gasification of all of the combustible constituents, including moisture, and the tarry substance of the fuel acted upon, leaving nothing but ash content as residue.

A further important object of the invention is to convert all of the recoverable raw material acted upon, into a gaseous form, thereby obtaining the maximum yield of gas per unit of raw material to obtain a particularly high degree of economy in the production of gas.

The invention comprises direct heating of the gas producing material by a bed of burning material thereunder within the generator to produce steam and gas by that heat and to utilize the pressure of such gas production for forcing it downwardly through the bed of incandescent fuel, whereby the action of heat and the resultant chemical reaction of the volatile constituents of the fuel are cracked into fixed and permanent gas, including the moisture and products from the tarry substance originally embodied in the raw material.

By the use of air or oxygen, and steam, the fixed carbon content of the fuel material is converted into water gas which consists of carbon monoxide, hydrogen and a small percent of carbon dioxide, all combined with the gas formed from the volatile hydro-carbons of the fuel.

The process further comprises the unique means of creating and maintaining the proper gas production temperature of the fuel acted upon by blowing pre-heated air or oxygen upwardly in about the center of the incandescent carbon bed, whereby at least a portion of the carbon is burned with all of the oxygen to carbon dioxide, which in turn is reduced to carbon monoxide as it passes down through the incandescent carbon bed.

A portion of heat generated in this incandescent zone is applied to the incoming fuel to cause a distillation of the volatile hydro-carbons therein to leave the solid carbon as fuel to be burned in the incandescent zone.

The gas produced from the solid fuels and steam may be enriched by introducing oil directly into the incandescent zone, together with air and oxygen to produce very rapid gasification of the oil. The oil gas, together with the fuel gas produced, is forced downwardly through the incandescent carbon bed where lamp black is arrested and converted into gas and the tarry substance of the oil is cracked into fixed and permanent gas, along with the fuel gas.

The above production of gas is conducted within a gas-tight generator continuously and the only substances leaving the generator are residue ash and gas, both of which are discharged through a common outlet to be separated, the ash dropping into a suitable container, the fly-ash washed out of the gas and the gas itself reduced in temperature without the condensation of any of its constituents.

These and other objects and advantages of the invention will be apparent to those versed in the following description of one particular form of the invention which may be carried out in any suitable type of apparatus. The particular form is more or less diagrammatically illustrated in the accompanying drawing, in which the single figure is a diagram in side elevation and partial section. This apparatus is described as follows:

A generator generally designated by the numeral 10 is formed to have a lower inverted frusto-conical section 11, the outer wall of which may be made of steel and lined sufficiently with a suitable refractory wall 12. On the upper end of this lower section 11 is fitted in a gas tight manner a cylindrical mid section 13 likewise lined with a refractory material. On the upper end of the mid section 13 is fitted in gas tight relation the conical section 14 which carries a head 15 on its upper end.

This head 15 has a side entering pipe 16 which is provided to conduct the fuel into the generator by any suitable means such as by the screw conveyor 17 as herein indicated. The head 15 is further provided with a cap or valve 18 of the quick-detachable nature, ordinarily held in a closed sealed position by means of the screw shaft 19 carried through the bar 20 supported above the head 15. In order to prevent loss of gas from the generator 10 on admitting fuel through the pipe 16, any suitable means for feeding the fuel without escape of gas may be employed, such as by employing a fuel hopper 61, through the lower portion of which passes the screw conveyor 17, the drive shaft 21 of the conveyor being carried through a suitable packing gland 22 externally of the hopper. The fuel hopper may be loaded with the desired fuel through its top which is normally closed by the quickly detachable valve or cover plate 23. The fuel hopper may be made of such depth and capacity as will permit a sufficient amount of fuel being carried therein as will prevent any material escape of gas upwardly therethrough when additional fuel is being added to the hopper.

The lower end of the generator section 11 opens into a receiving chamber 24 which is here shown as having a horizontally disposed floor 25 through which vertically extends a shaft 26 in gas tight manner. It is understood that the chamber 24 is fitted to the open end of the generator section 11 in a gas tight manner.

Placed centrally within the lower end of the generator section 11 is a conical grate 27 which is provided with slots 28 therearound through which the residue ash may fall. The larger particles of the residue which may not pass through these slot openings 28 may travel down the inclined face of the grate 27 to be engaged by projections 29 extending outwardly from the lower portion of the grate so that as the grate 27 may be revolved, these larger particles will be ground up or at least reduced in size sufficiently as will permit them to fall through the annular opening left around the lower end of the grate and the throat or opening end of the generating section 11. In order to resist wear under this grinding action the throat of the section 11 is preferably provided with a metal ring 30, here shown as extending in the upper portion of the chamber 24. The shaft 26 may be revolved in any suitable manner such as through a drive shaft 31, a worm 32 and a worm wheel 33 mounted on the shaft 26.

The generator mid-section 13 carries a conduit or pipe 34 which crosses it diametrically and projects beyond it at each side of the section. This pipe 34, in the form herein shown, is provided with a surrounding jacket 35 through which water may be circulated for the purpose of keeping the pipe 34 cooled to within working limits of the pipe contents, and to prevent distortion thereof by undue heating. In the form herein shown, the jacket 35 is provided with a water inlet connection 36 and a water discharge pipe 37.

The pipe 34 is provided with a central upwardly directed discharge jet or nozzle 38 opening into the generator within the mid-section 13. The pipe 34 is provided with suitable fittings on its outer ends for the selective admission of air or oxygen, oil and steam.

In placing the generator in operation, fuel is admitted to the generator and ignited in any suitable manner such as by dropping incandescent coals therein. Air may be initially supplied through the upper pipe 39 in the head 15 and the lower ports 40 in the lower section 11, it being understood that the pipe 39 and the ports 40 are normally closed after the initial starting of the operation. Fuel is added to the generator to completely fill it up to the head 15 and combustion is maintained after being initiated by air escaping through the jet 38 into the central portion of the fuel within the mid section 13. The combustion zone then extends from slightly above the grate 27 to a short distance above the jet 38 within the mid section 13 with the raw fuel thereabove and being heated thereby.

Thus, by burning part of the fuel, the upper portion is initially heated to drive out first the more volatile portions which set up a slight pressure tending to drive the gas produced downwardly and out through the lower throat of the generator to the chamber 24. Tars and other liquids driven off by the heat pass downwardly through the incandescent zone and are thereby gasified. The residue as above indicated is in the form of an ash which likewise is dropped into the chamber 24. This residue is removed from the chamber 24 by means of a vane 41 which hangs downwardly from the grate 27 so as to scrape the ash around to drop into the discharge pipe 42. Both the ash and the gases from the generator travel outwardly through this pipe 42 into the ash receptacle 43 which is sufficiently large to receive and retain the ash over a rather long period of operation before the receptacle has to be cleaned. The ash may be removed through the lower valve 44. The incoming residue is directed toward the bottom of the receptacle by the slope of the pipe 42. Gas is conducted from the receptacle 43 by the pipe 62 leading from near the top of the receptacle 43 into the lower end of the gas washer. This gas entering the washer 45 will convey with it some fly ash. This material is removed from the gas in the washer 45 by water discharged from the pipe 46 through a central hole 47 provided in the upper cover 48 of the washer.

Within the washer 45 is a lower inverted cone 49 secured by its upper end in substantially gas tight relation around the inner side of the wall of the washer. The lower end or apex of the cone 49 is provided with an opening through which the gas coming from the pipe 44 may escape upwardly. Above the inverted cone 49 is mounted a cone 50 which has its lower end spaced inwardly from the wall of the washer a sufficient distance to leave a rather narrow annular opening therearound.

As the water comes through the opening 47, it drops onto the apex of the cone 50 and thus flows down in a continuous sheet over the entire surface of the cone 50 to discharge through the annular opening about its base into the cone 50 to flow in a more or less continuous sheet thereover and discharge from the lower opening into the bottom of the washer. Thus, it is to be seen that the water is flowing downwardly against the upwardly rising gas over the same path that the gas must travel to escape.

The discharge water from the washer flows through the pipe 51 into the trap 52 and out the discharge 53. As indicated by the drawing, the discharge 53 is provided at a sufficient elevation above the lower end of the entering pipe 51 to form a seal so as to prevent the escape of gas.

From the washer 45, the gas flows through the opening 47 into a receiving chamber 54 from which the gas is conducted through the pipe 55 to the upper end of a condenser 56 which is herein shown as being mounted directly above the washer. In this condenser the gas enters a receiving chamber 57 from which the gas may flow downwardly through a plurality of tubes 58 into a cooling chamber 59 from which the gas may be taken for the use desired. The condenser is formed to have the tubes 58 surrounded by water which enters from a water inlet pipe 60 to flow upwardly around the tubes 58 and then discharge through the pipe 46 into the washer. Since the gas coming from the generator 10 is carrying volatile matter that might otherwise be condensed by sudden chilling, the water entering the washer 45 is pre-heated by being initially carried through the condenser as above indicated so that the temperature of the gas is not suddenly reduced by being brought into contact with cool water. By conducting the gas through the washer and the condenser with the water flow as indicated, there is no precipitation produced and the gas thereby retains all of its constituents in the gasified state although eventually reduced in temperature.

It is thus to be seen that the generator 10 may be operated in a continuous manner without interruptions for the admission of fuel. It is also to be seen that the travel of the volatile matter and gases produced is always downwardly through the incandescent fuel bed and that the incandescent zone is maintained and limited by the transversely extending pipe 34 and its single central jet 38. This pipe further serves as a means for admitting steam and oil to secure the proper calorific values. It is further to be noted that in the form herein shown and described, no water seals are required. In further reference to the introduction of the air in the central part of the mid section 13, this mode of introduction provides for the heating of the air and for the uniform combustion of the fuel through the central portion and prevents the heretofore occasioned difficulty of by-passes being formed through the fuel bed when the air was introduced from above or a vacuum applied at the base of the generator.

While I have herein shown and described my invention in the one particular form, it is obvious that variations may be employed without departing from the spirit of the invention, and I therefore do not desire to be limited to that precise process beyond the limitations as may be imposed by the following claims.

I claim:

1. That process of continuously producing gas which comprises feeding solid carbonaceous fuel into the upper part of a gas-sealed generator to allow it to drop downwardly therein, introducing oxygen into said downwardly descending fuel by forcing substantially all of said oxygen vertically and centrally upward against the downwardly moving fuel, establishing a combustion zone in the fuel in the generator, the top of which zone is maintained by the rate of fuel feeding and oxygen flow substantially at the level of the introduction of said oxygen to be substantially at the vertically central part of the generator to have the heat from said combustion transmitted upwardly to the down-feeding fuel for pre-heating of the fuel and intermingling oxygen whereby gases generated in said zone may be reduced in passing through hot fuel therebelow, said oxygen being limited in amount to be completely used up in said zone, and drawing off from the lower end of the generator under said combustion zone the produced gases under pressure generated in the generator.

2. The process of continuously producing gas which comprises feeding solid carbonaceous fuel into the upper part of a gas-sealed generator to allow it to drop downwardly therein, introducing oxygen into said downwardly descending fuel by forcing substantially all of said oxygen vertically and centrally upward against the downwardly moving fuel, establishing a combustion zone in the fuel in the generator, the top of which zone is maintained by the rate of fuel feeding and oxygen flow substantially at the level of the introduction of said oxygen to be substantially at the vertically central part of the generator to have the heat from said combustion transmitted upwardly to the down-feeding fuel for pre-heating of the fuel and intermingling oxygen whereby gases generated in said zone may be reduced in passing through hot fuel therebelow, said oxygen being limited in amount to be completely used up in said zone, and drawing off from the lower end of the generator under said combustion zone the produced gases under pressure generated in the generator, and drawing off ashes from said zone with the flow of said gases.

JOHN U. McDONALD.